(12) United States Patent
Onoto

(10) Patent No.: US 11,397,877 B2
(45) Date of Patent: Jul. 26, 2022

(54) TAPE CASSETTE INCLUDING CASSETTE MEMORY HAVING FIRST AREA AND SECOND AREA, AND PRINTING DEVICE USING THE SAME

(71) Applicant: BROTHER KOGYO KABUSHIKI KAISHA, Nagoya (JP)

(72) Inventor: Shoji Onoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 127 days.

(21) Appl. No.: 17/023,106

(22) Filed: Sep. 16, 2020

(65) Prior Publication Data
US 2021/0097356 A1 Apr. 1, 2021

(30) Foreign Application Priority Data
Sep. 27, 2019 (JP) .............................. JP2019-176316

(51) Int. Cl.
G06K 15/00 (2006.01)
G06K 15/02 (2006.01)
B41J 15/04 (2006.01)
B41J 3/407 (2006.01)
B41J 32/00 (2006.01)

(52) U.S. Cl.
CPC .......... *G06K 15/022* (2013.01); *B41J 3/4075* (2013.01); *B41J 15/044* (2013.01); *B41J 32/00* (2013.01)

(58) Field of Classification Search
None
See application file for complete search history.

(56) References Cited

U.S. PATENT DOCUMENTS

| 6,738,903 | B1* | 5/2004 | Haines | B41J 2/17566 |
| | | | | 705/75 |
| 9,893,893 | B2* | 2/2018 | Ness | H04L 9/3236 |
| 9,961,234 | B1* | 5/2018 | Panshin | G06F 21/57 |
| 2007/0101442 | A1* | 5/2007 | Bondurant | G06F 21/64 |
| | | | | 726/34 |
| 2017/0261884 | A1* | 9/2017 | Kyotani | G03G 15/0865 |
| 2018/0109385 | A1* | 4/2018 | Ness | H04L 9/3226 |
| 2018/0207966 | A1* | 7/2018 | Ito | G06K 7/10366 |

FOREIGN PATENT DOCUMENTS

JP 4109164 B2 7/2008
JP 2009-61709 A 3/2009

\* cited by examiner

*Primary Examiner* — Dung D Tran
(74) *Attorney, Agent, or Firm* — Kenealy Vaidya LLP

(57) ABSTRACT

A tape cassette includes: a case; and a cassette memory. The case accommodates therein a tape as a printing medium. The cassette memory includes: a first area; and a second area. The first area stores therein unique information specific to the tape cassette. The second area stores therein arbitrary information in an entire area thereof. The second area is set to a non-rewritable state using a first password such that the arbitrary information written therein is not rewritable. The first password is generated using a unique value which is a value of at least a part of the unique information stored in the first area and a first selection value which is an arbitrary value stored in a part of the second area specified by a predetermined rule.

7 Claims, 9 Drawing Sheets

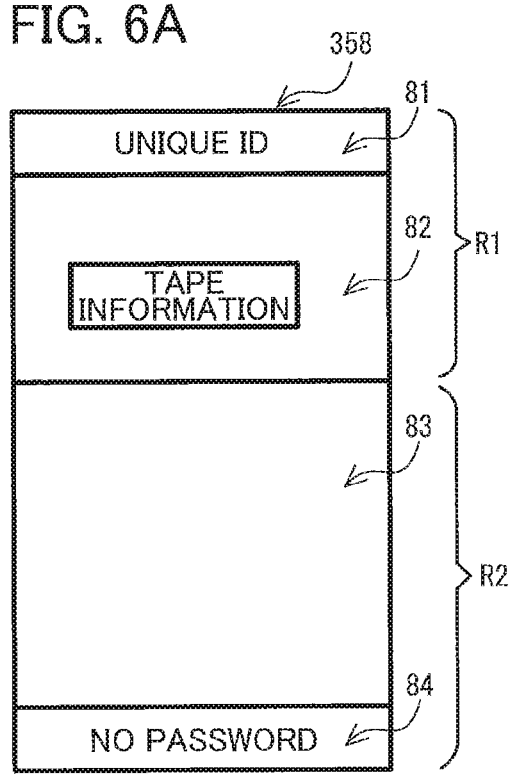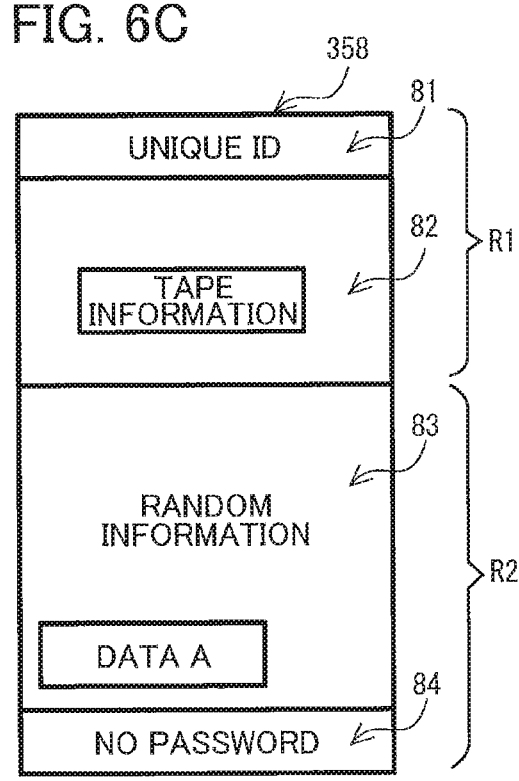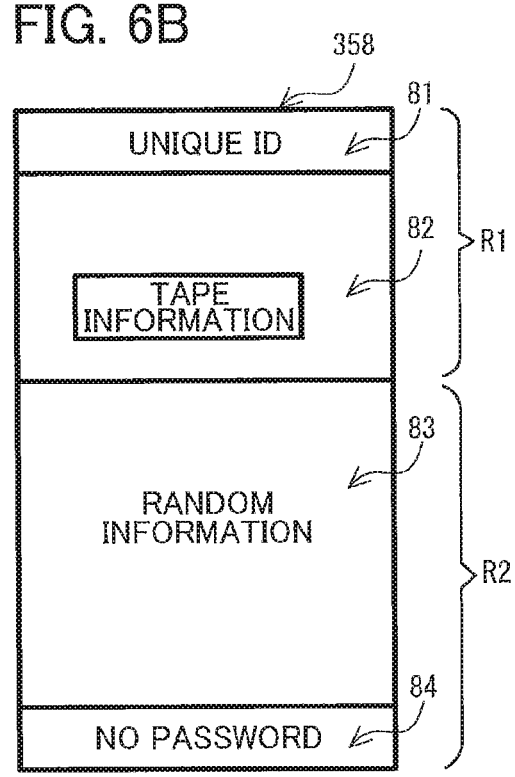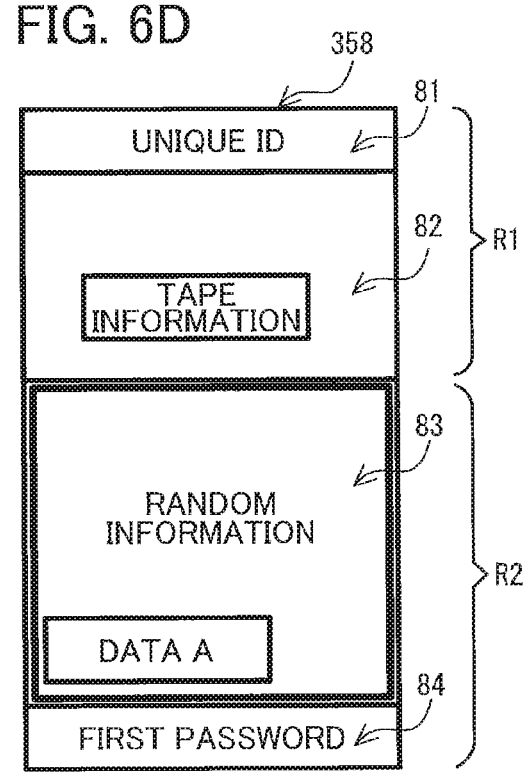

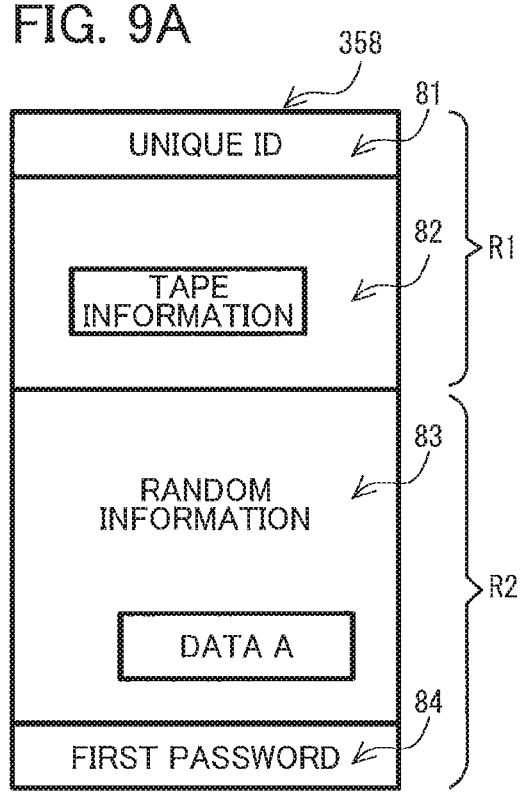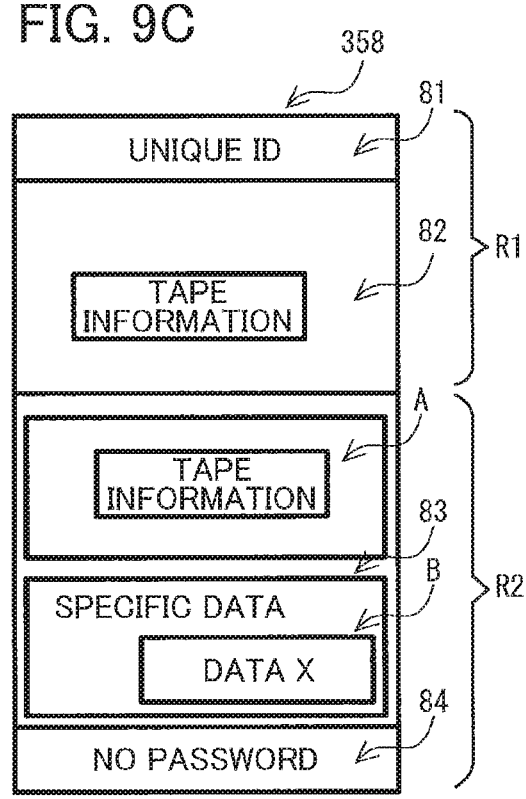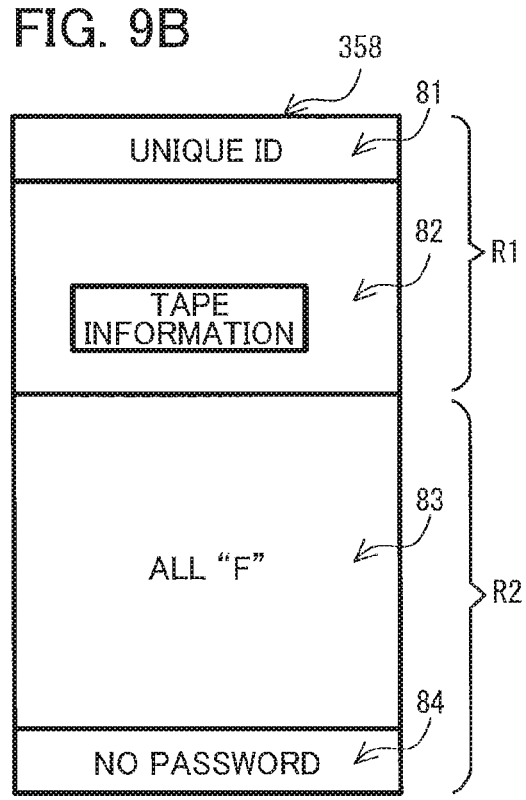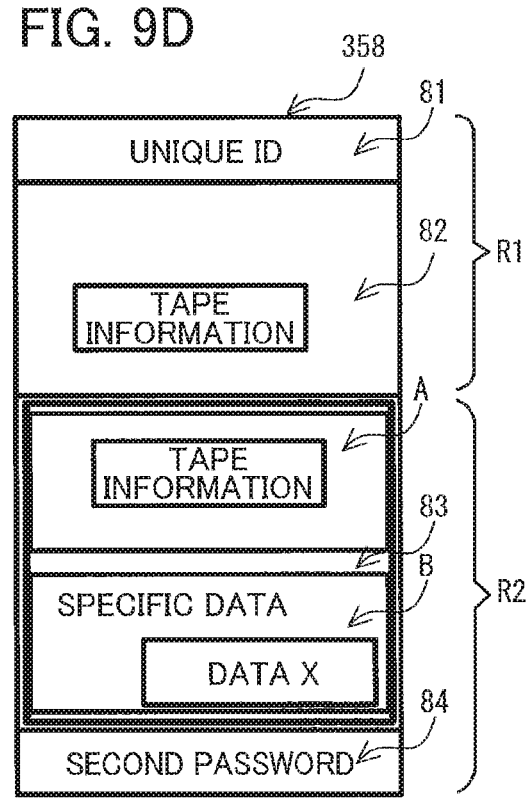

TAPE CASSETTE INCLUDING CASSETTE MEMORY HAVING FIRST AREA AND SECOND AREA, AND PRINTING DEVICE USING THE SAME

CROSS REFERENCE TO RELATED APPLICATION

This application claims priority from Japanese Patent Application No. 2019-176316 filed Sep. 27, 2019. The entire content of the priority application is incorporated herein by reference.

TECHNICAL FIELD

The present disclosure relates to a tape cassette and a printing device.

BACKGROUND

Japanese Patent Application Publication No. 2009-061709 discloses a tape printing system configured of a tape cartridge and a tape printer to which the tape cartridge is attachable. The tape cartridge includes an IC chip. The IC chip stores therein identification information for identifying the tape cartridge, and is locked by a password. When the tape cartridge is mounted on the tape printer, the tape printer displays a message prompting a user to input the password. When a password has been inputted, the tape printer references the password stored in the IC chip to determine the validity of the password inputted by the user.

SUMMARY

However, with the conventional tape printing system described above, information and the like stored in the IC chip could be altered by another device or the like if the password for the tape cartridge were leaked.

In view of the foregoing, it is an object of the present disclosure to provide a tape cassette and a printing device capable of improving the security of information stored in a memory of the tape cassette.

In order to attain the above and other objects, according to one aspect, the present disclosure provides a tape cassette including: a case; and a cassette memory. The case accommodates therein a tape as a printing medium. The cassette memory includes: a first area; and a second area. The first area stores therein unique information specific to the tape cassette. The second area stores therein arbitrary information in an entire area thereof. The second area is set to a non-rewritable state using a first password such that the arbitrary information written therein is not rewritable. The first password is generated using a unique value which is a value of at least a part of the unique information stored in the first area and a first selection value which is an arbitrary value stored in a part of the second area specified by a predetermined rule.

According to another aspect, the present disclosure also provides a printing device including: an attachment portion to which the above tape cassette is attachable; a device memory; and a controller. The device memory stores therein the predetermined rule in advance. The controller is configured to perform: (a) acquiring the unique information from the first area of the cassette memory of the tape cassette attached to the attachment portion; (b) generating a first password using the unique value included in the unique information acquired in the acquiring and the first selection value specified by the predetermined rule stored in the device memory; (c) attempting to cancel the non-rewritable state of the second area using the first password generated in the generating; (d) writing a specific value into the entire area of the second area in which the non-rewritable state has been cancelled in the attempting; (e) writing a copy of the unique information stored in the first area of the cassette memory into a part of the second area into which the specific value has been written in the writing; (f) generating a second password different from the first password; and (g) setting, using the second password generated in the generating, the second area into which the unique information has been written in the writing to the non-rewritable state.

BRIEF DESCRIPTION OF THE DRAWINGS

The particular features and advantages of the embodiment(s) as well as other objects will become apparent from the following description taken in connection with the accompanying drawings, in which:

FIG. 6A is a conceptual diagram illustrating a cassette memory 358 of the tape cassette 30 according to the embodiment in the password generation process, and illustrating a state where a unique ID of the tape cassette 30 is written into an ID identification area 81 of a first area R1 and tape information is written into a tape information area 82 of the first area R1 of the cassette memory 358;

FIG. 6B is a conceptual diagram illustrating the cassette memory 358 of the tape cassette 30 according to the embodiment in the password generation process, and illustrating a state where random information is written into an address area 83 of a second area R2 of the cassette memory 358;

FIG. 6C is a conceptual diagram illustrating the cassette memory 358 of the tape cassette 30 according to the embodiment in the password generation process, and illustrating a state where a first selection value Data A is read from the random information in the address area 83;

FIG. 6D is a conceptual diagram illustrating the cassette memory 358 of the tape cassette 30 according to the embodiment in the password generation process, and illustrating a state where a first password is written into a password area 84 of the second area R2 and the address area 83 is set to a non-rewritable state;

FIG. 9A is a conceptual diagram illustrating the cassette memory 358 of the tape cassette 30 according to the embodiment in the main process, and illustrating a state where the first selection value Data A is read from the random information in the address area 83;

FIG. 9B is a conceptual diagram illustrating the cassette memory 358 of the tape cassette 30 according to the embodiment in the main process, and illustrating a state where the formatting process is executed to the address area 83;

FIG. 9C is a conceptual diagram illustrating the cassette memory 358 of the tape cassette 30 according to the embodiment in the main process, and illustrating a state where the tape information is written into a region A of the address area 83 and specific data is written into a region B of the address area 83; and FIG. 9D is a conceptual diagram illustrating the cassette memory 358 of the tape cassette 30 according to the embodiment in the main process, and illustrating a state where a second password is written into the password area 84 and the address area 83 is set to a non-rewritable state.

DETAILED DESCRIPTION

Figure 1:
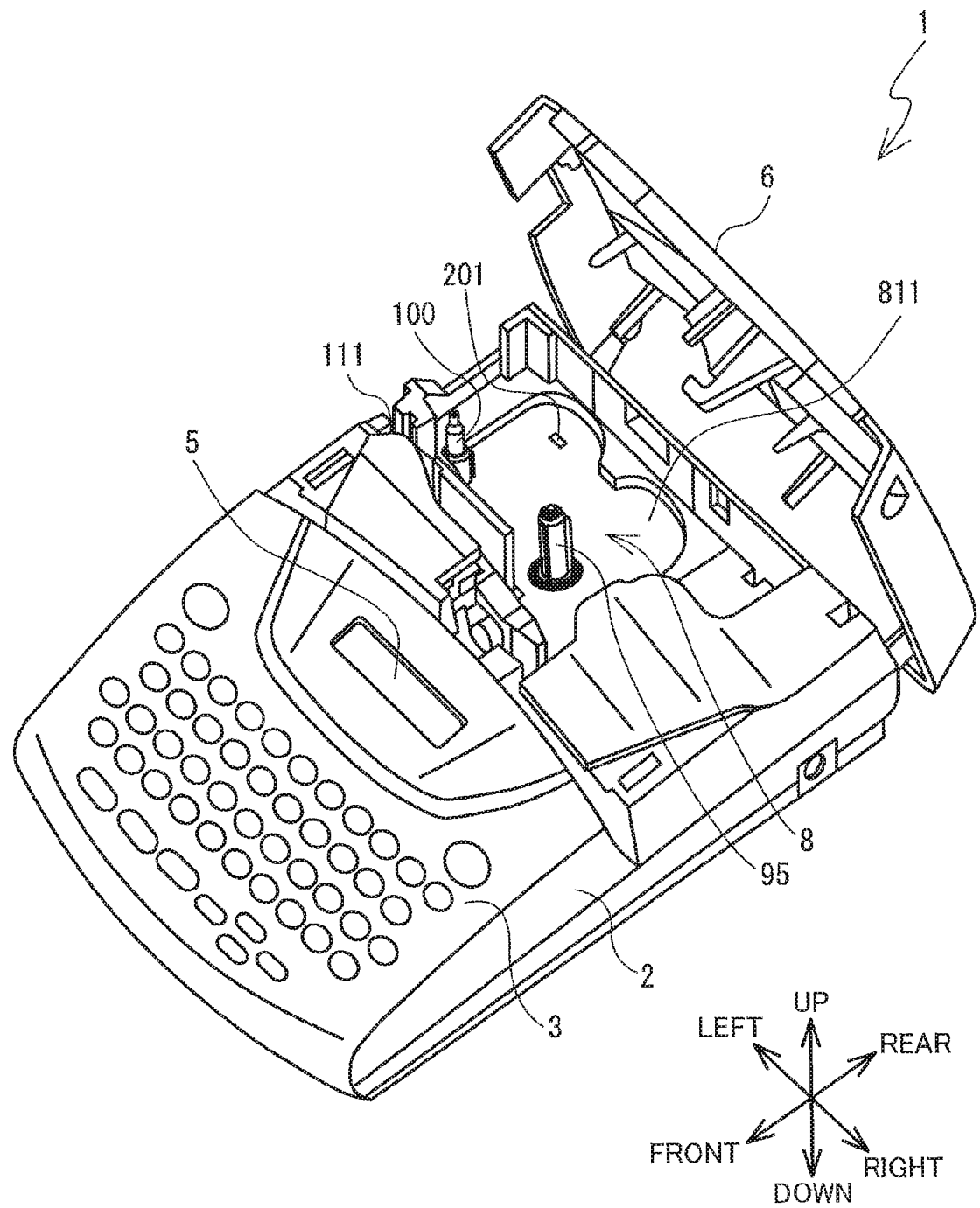
FIG. 1 is a perspective view of a printing device 1 according to one embodiment of the present disclosure in which a cassette cover 6 is open.

Hereinafter, a printing device 1 and a tape cassette 30 according to one embodiment of the present disclosure will be described while referring to the accompanying drawings.

The referenced drawings are merely exemplary used to illustrate technical features that the present disclosure may employ, and configurations of devices, parts and components according to the embodiment should not be considered to limit the present disclosure. Further, in the following description, directions with respect to the printing device 1 will be referred to based on those illustrated in FIG. 1. More specifically, a diagonally lower-left side, a diagonally upper-right side, a diagonally lower-right side, a diagonally upper-left side, an upper side, and a lower side in FIG. 1 will be respectively defined as a front side, a rear side, a right side, a left side, an upper side and a lower side of the printing device 1. Further, directions with respect to the tape cassette 30 will be referred to based on those illustrated in FIG. 2. More specifically, a diagonally lower-right side, a diagonally upper-left side, a diagonally upper-right side, a diagonally lower-left side, an upper side, and a lower side in FIG. 2 will be respectively defined as a front side, a rear side, a right side, a left side, an upper side, and a lower side of the tape cassette 30.

Further, in the following description, a frontward direction and a rearward direction will be correctively referred to as a frontward/rearward direction; a leftward direction and a rightward direction will be correctively referred to as a leftward/rightward direction; and an upward direction and a downward direction will be correctively referred to as an upward/downward direction.

<Printing Device 1>

The printing device 1 will be described with reference to FIGS. 1 through 3. The printing device 1 is a general-purpose printer capable of accepting various types of tape cassettes for use, such as a thermal-type tape cassette, a receptor-type tape cassette, and a laminated-type tape cassette. The thermal-type tape cassette includes a heat-sensitive tape. The receptor-type tape cassette includes a print tape and an ink ribbon. The laminated-type tape cassette 30 which will be described below includes a double-sided adhesive tape 58, a film tape 59, and an ink ribbon 60. The double-sided adhesive tape 58 is a transparent or colored tape, and the film tape 59 is a transparent tape. Various colors are used for the double-sided adhesive tape 58 and the ink of the ink ribbon 60, and varied tape cassettes 30 with different color combinations of double-sided adhesive tapes 58 and ink ribbons 60 may be offered.

As illustrated in FIG. 1, the printing device 1 includes a main housing 2 of a generally rectangular parallelepiped shape. A keyboard 3 is provided on a frontward portion on an upper surface of the main housing 2. A liquid crystal display 5 is provided rearward of the keyboard 3. A cassette cover 6 is provided rearward of the liquid crystal display 5. The cassette cover 6 is supported by the main housing 2, and is configured to be opened and closed for replacement of the tape cassette 30 (see FIG. 2) with a new tape cassette 30.

Inside the main housing 2, a cassette attachment portion 8 is provided for detachably receiving the tape cassette 30. An ejection slit 111 is formed in a left side wall of the main housing 2, more specifically, at a rearward portion of the left side wall near the cassette attachment portion 8. A printed tape 50 is ejected out of the cassette attachment portion 8 through the ejection slit 111.

Figure 2:
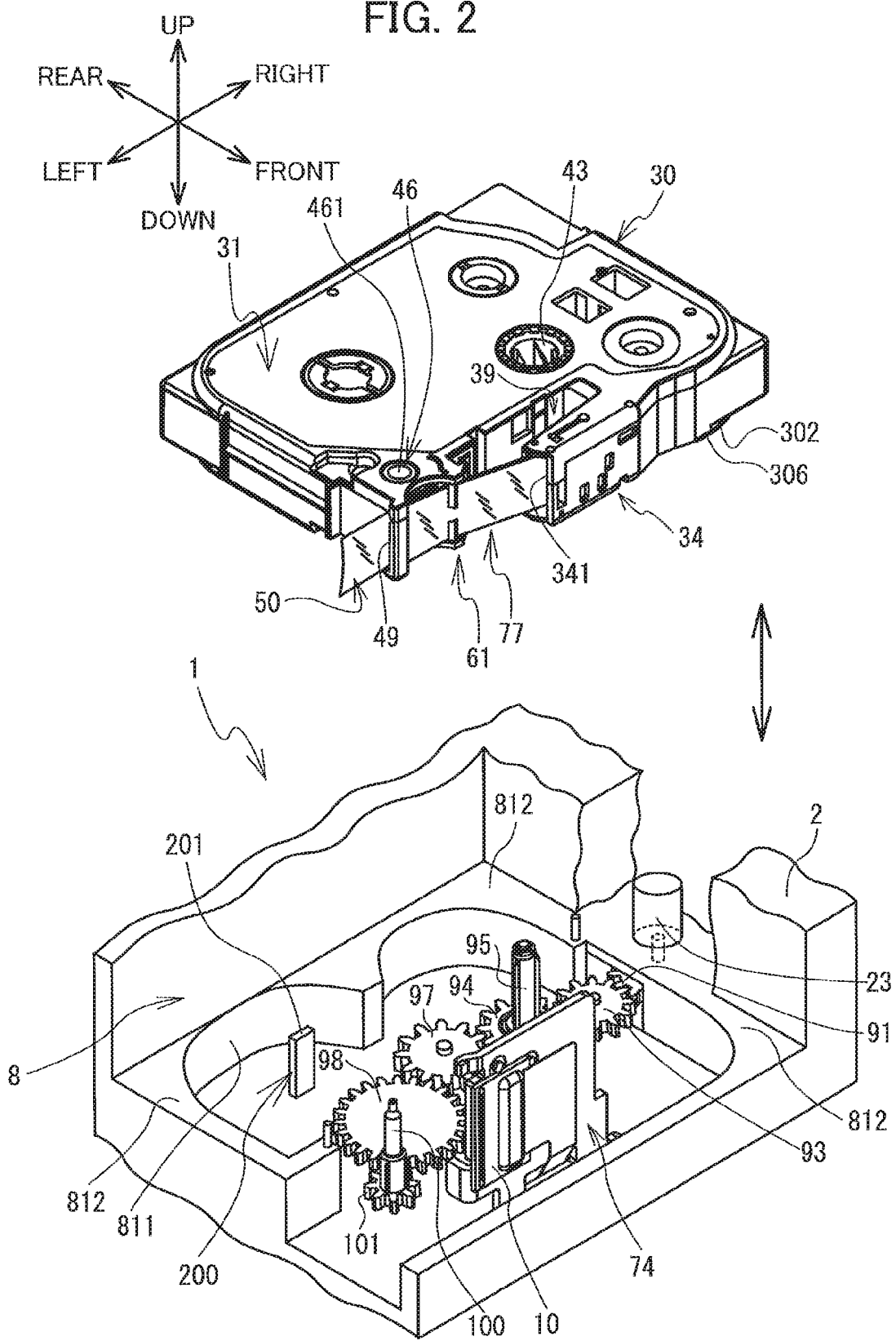
FIG. 2 is a perspective view of a tape cassette 30 according to the embodiment and a cassette attachment portion 8 of the printing device 1 according to the embodiment.

As illustrated in FIGS. 1 and 2, the cassette attachment portion 8 includes a cavity 811 and corner support portions 812. The cavity 811 has a recessed shape with a flat bottom surface so as to generally conform with a bottom surface of the tape cassette 30 (more specifically, a bottom surface 302 of a cassette case 31 of the tape cassette 30). The corner support portions 812 are flat surface portions extending horizontally from an outer edge of the cavity 811. The corner support portions 812 are configured to support lower surfaces of marginal portions of the tape cassette 30 attached to the cassette attachment portion 8.

A head holder 74 made from metal is provided at a front portion of the cassette attachment portion 8. A thermal head 10 including heat generating elements (not illustrated) is mounted on the head holder 74. The head holder 74 is inserted in a head opening 39 (described later) of the tape cassette 30 upon attachment of the tape cassette 30 to the cassette attachment portion 8.

Referring to FIG. 2, a tape feed motor 23 having a drive shaft is positioned outside of the cassette attachment portion 8. A gear train including gears 91, 93, 94, 97, 98 and 101 is provided below a bottom surface of the cavity 811. That is, the gear train is covered and hidden by the bottom surface of the cavity 811 (see FIG. 1). However, for simplifying description, the bottom surface of the cavity 811 is not illustrated in FIG. 2. The gear 91 is fixed to a lower end portion of the drive shaft of the tape feed motor 23. In the gear train, the gear 91 is in meshing engagement with the gear 93 which is in meshing engagement with the gear 94. The gear 94 is in meshing engagement with the gear 97 which is in messing engagement with the gear 98, which is in meshing engagement with the gear 101.

A ribbon take-up shaft 95 is fixed to the gear 94 and extends upward from an upper surface of the gear 94. A ribbon take-up spool 43 of the tape cassette 30 is attachable to and detachable from the ribbon take-up shaft 95. A tape drive shaft 100 is fixed to the gear 101 and extends upward from an upper surface of the gear 101. The tape drive shaft 100 is insertable into and removable from a hole 461 of a tape drive roller 46 of the tape cassette 30 in accordance with attachment/detachment of the tape cassette 30 relative to the cassette attachment portion 8.

As described above, the gears 91 through 101 are disposed at positions below a bottom plate constituting a bottom surface of the cavity 811. Further, the ribbon take-up shaft 95 and the tape drive shaft 100 penetrate corresponding through-holes formed in the bottom plate and extend upward.

In a state where the tape cassette 30 is attached to the cassette attachment portion 8, a counterclockwise rotation of the gear 91 driven by the tape feed motor 23 causes a counterclockwise rotation of the ribbon take-up spool 95 through the gears 93 and 94. Hence, the ribbon take-up spool 43 attached to the ribbon take-up shaft 95 rotates in a counterclockwise direction. Further, the rotation of the gear 94 is transmitted to the tape drive shaft 100 through the gears 97, 98 and 101, so that the tape drive shaft 100 rotates in a clockwise direction, thereby rotating the tape drive roller 46 attached to the tape drive shaft 100.

Figure 3:
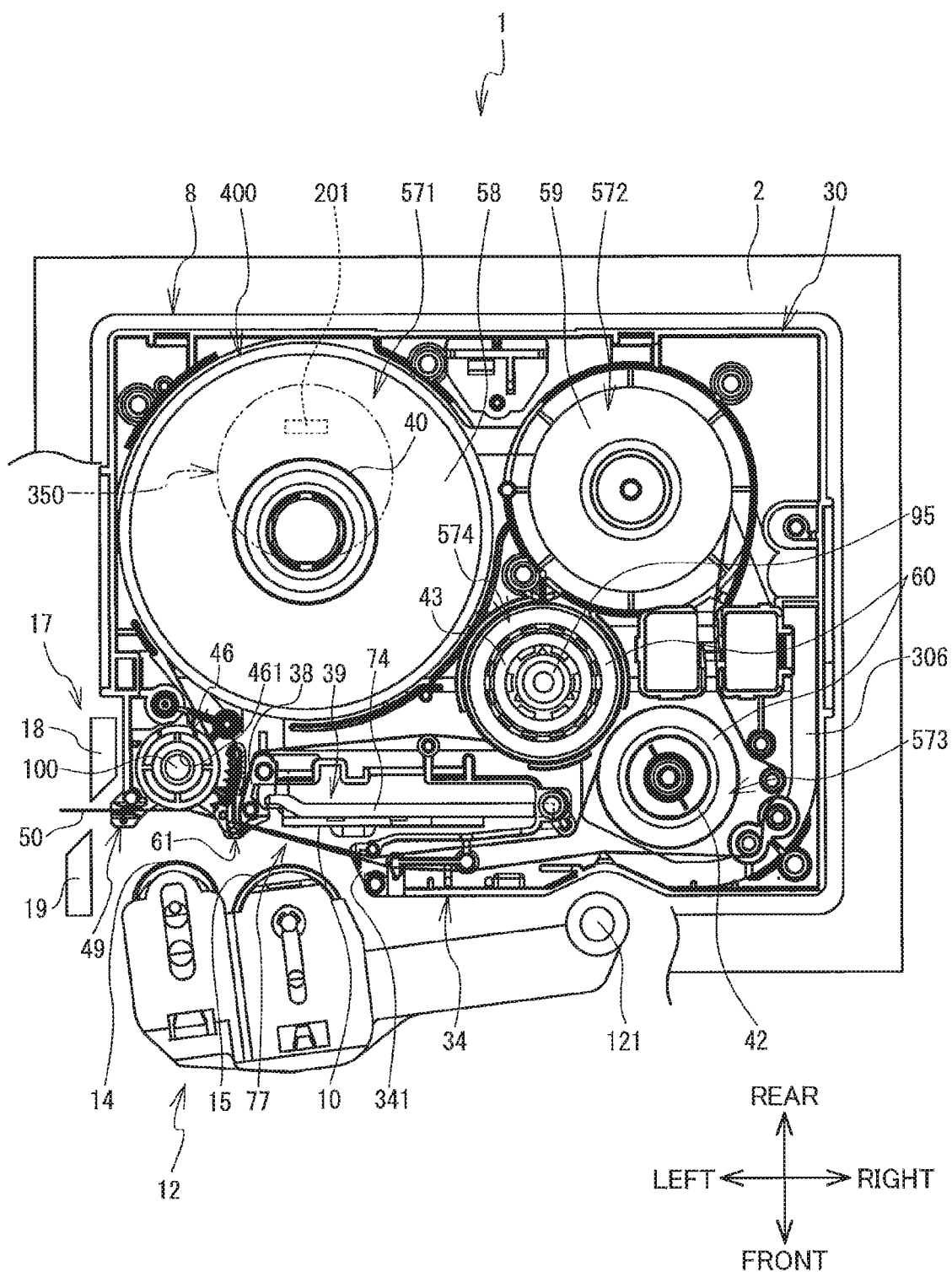
FIG. 3 is a plan view of the cassette attachment portion 8 to which the tape cassette 30 according to the embodiment has been attached.

As illustrated in FIG. 3, an arm-shaped platen holder 12 is positioned frontward of the head holder 74. The platen holder 12 has a base end portion supported by a pivot shaft 121 and pivotable about an axis of the pivot shaft 121, and a free end portion rotatably supporting a platen roller 15 and a movable conveyer roller 14. The platen roller 15 is configured to oppose the thermal head 10 to make contact with and separate from the thermal head 10. The movable conveyer roller 14 is configured to oppose the tape drive roller 46 attached to the tape drive shaft 100 so that the movable conveyer roller 14 can contact and separate from the tape drive roller 46.

The platen holder 12 is connected to a release lever (not illustrated) that is movable leftward and rightward in interlocking relation to opening/closing motions of the cassette cover 6. The release lever is configured to move rightward to move the platen holder 12 toward a standby position illustrated in FIG. 3 in accordance with the opening motion of the cassette cover 6. In the standby position, the platen holder 12 is positioned away from the cassette attachment portion 8. Hence, a user can perform attachment and detachment of the tape cassette 30 to and from the cassette attachment portion 8.

The release lever is configured to move leftward to move the platen holder 12 rearward toward a printing position (not illustrated) in accordance with the closing motion of the cassette cover 6. In the printing position, the platen holder 12 is positioned adjacent to the cassette attachment portion 8. In the attached state of the tape cassette 30 to the cassette attachment portion 8, the platen roller 15 presses against the thermal head 10 through the tape, and at the same time, the movable conveyer roller 14 presses against the tape drive roller 46 through the tape. In the printing position, the printing device 1 can perform printing using the tape cassette 30 attached to the cassette attachment portion 8.

A cutting mechanism 17 (see FIG. 3) is positioned rightward of the ejection slit 111 (FIG. 1). The cutting mechanism 17 is configured to cut the tape 50 ejected from the tape cassette 30 at a predetermined position. The cutting mechanism 17 includes a fixed blade 18 and a movable blade 19 both of which are made of metal. The movable blade 19 opposes the fixed blade 18, and is movable in the frontward/rearward direction (upward and downward in FIG. 3) relative to the fixed blade 18.

The printing device 1 also includes an RFID reader/writer 200 (see FIG. 2) configured to read and write data with respect to a RF (radio frequency identification) tag through short range wireless communication. The RFID reader/writer 200 has a well-known configuration in the art and includes an antenna 201 and a writer IC 203 (see FIG. 4). As illustrated in FIGS. 1 and 2, the antenna 201 is positioned at the bottom surface of the cavity 811.

<Tape Cassette 30>

Overall configuration of the tape cassette 30 will be described next with reference to FIGS. 2 and 3. The tape cassette 30 accommodates therein the film tape 59 that serves as a printing medium. The tape cassette 30 is a versatile cassette attachable to a thermal printer, a laminated-type printer, and a receptor-type printer by suitably changing the kind of the tape accommodated in the cassette case 31.

The tape cassette 30 includes the cassette case 31 having a box-like shape and accommodating therein the double-sided adhesive tape 58, the film tape 59, the ink ribbon 60, and the like. A tape spool 40 about which the double-sided adhesive tape 58 is wound is rotatably supported in a left-rear portion of the cassette case 31. A ribbon spool 42 about which unused ink ribbon 60 is wound is rotatably supported in a right-front portion of the cassette case 31.

The ribbon take-up spool 43 is rotatably supported at a position between the tape spool 40 and the ribbon spool 42 of the tape cassette 30 attached to the cassette attachment portion 8. The ribbon take-up spool 43 is configured to draw unused ink ribbon 60 out of the ribbon spool 42 and to take up the ink ribbon 60 that has been used for printing. The tape drive roller 46 is rotatably supported in a left-front portion of the cassette case 31 in the attached state of the tape cassette 30 to the cassette attachment portion 8. The tape drive roller 46 is configured to draw the double-sided adhesive tape 58 out of the tape spool 40 and to convey the same. A downstream end and an upstream end of the tape 50 relative to the conveying direction correspond to the leading end and trailing end of the tape 50 in the longitudinal direction, respectively.

The cassette case 31 includes a bottom wall 306 (see FIGS. 2 and 3). An RFID tag 350 is disposed on the bottom wall 306 (see FIG. 3). The RFID tag 350 is capable of reading and writing data through wireless communication. The RFID tag 350 has a seal base (not illustrated), and includes a cassette memory 358 (see FIG. 4) and an antenna 353 (see FIG. 4). The seal base is a circular film-like sheet with an adhesive layer formed on its back surface. The cassette memory 358 and the antenna 353 are arranged on the top surface of the seal base.

The cassette memory 358 is an IC chip that is provided with a high-frequency circuit, memory, a power supply circuit, and the like, and is disposed on a center portion of the seal base in a plan view. The antenna 353 is a coiled antenna wound around the cassette memory 358 on the seal base. In a plan view, the RFID tag 350 is smaller than a first tape region 400 (described later). The RFID tag 350 is disposed at a position for vertically opposing the antenna 201 when the tape cassette 30 is mounted in the cassette attachment portion 8. The RFID tag 350 is a passive RFID tag but may bean active RFID tag instead.

Next, a printing operation performed in the printing device 1 will be described with reference to FIG. 3.

As the printing operation is initiated, the tape drive roller 46 and the ribbon take-up spool 43 are driven to rotate. The double-sided adhesive tape 58 is paid out from a first tape roll 571, and the film tape 59 is paid out from a second tape roll 572 by the cooperation of the tape drive roller 46 and the movable conveyer roller 14. The film tape 59 paid out from the second tape roll 572 is to be conveyed toward a right-front corner portion of the cassette case 31, passes through a region outside of the supply ribbon roll 573, and is then to be conveyed toward an inside of an arm portion 34. The double-sided adhesive tape 58 paid out from the first tape roll 571 is to be conveyed toward a front side of the tape drive roller 46. In accordance with the rotation of the ribbon take-up spool 43, the ink ribbon 60 is paid out from the supply ribbon roll 573 and is to be conveyed toward the inside of the arm portion 34.

The film tape 59 and the ink ribbon 60 conveyed inside the arm portion 34 is configured to be overlapped with each other at a discharge opening 341, and then to be discharged toward an exposure region 77. In the exposure region 77, characters are printed on the film tape 59 by the thermal head 10 using the ink ribbon 60 overlapped with the film tape 59. The ink ribbon 60 used for printing is separated from the film tape 59 by a separator 61, moved along a ribbon guide wall 38, and finally wound over a take-up ribbon roll 574. The film tape 59 separated from the ink ribbon 60 is conveyed toward the front side of the tape drive roller 46.

The film tape 59 and the double-sided adhesive tape 58 moving through a position between the tape drive roller 46 and the movable conveyer roller 14 are conveyed toward a tape discharge portion 49. At this time, the double-sided adhesive tape 58 is adhered onto a printed surface of the film tape 59 to provide the printed tape 50. The printed tape 50 is then discharged outside of the cassette case 31 through the tape discharge portion 49, and is cut by the cutting mechanism 17.

<Electrical Configuration>

Figure 4:
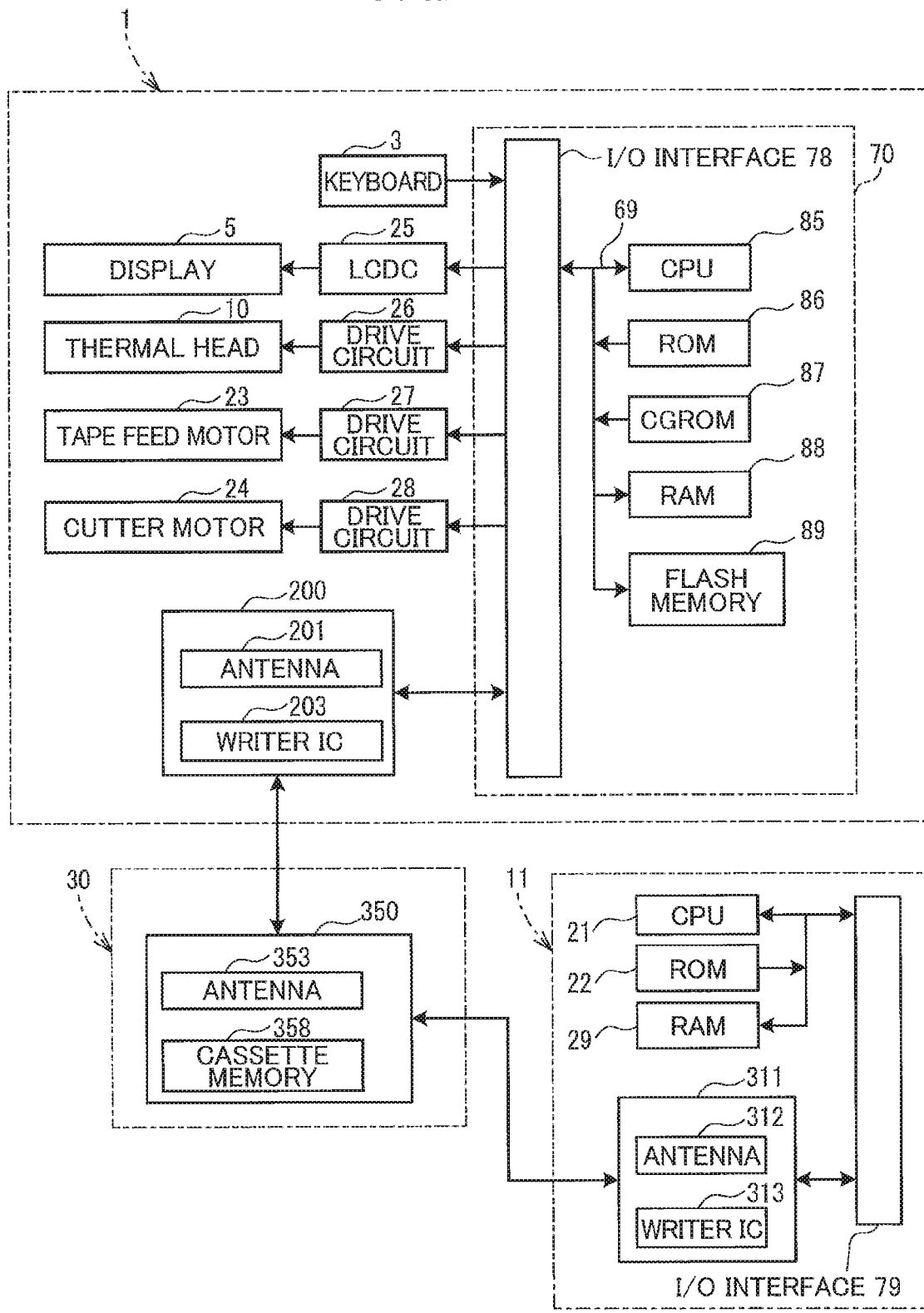
FIG. 4 is a block diagram illustrating an electrical configuration of the tape cassette 30 according to the embodiment, the printing device 1 according to the embodiment, and an external device 11.
Figure 5:
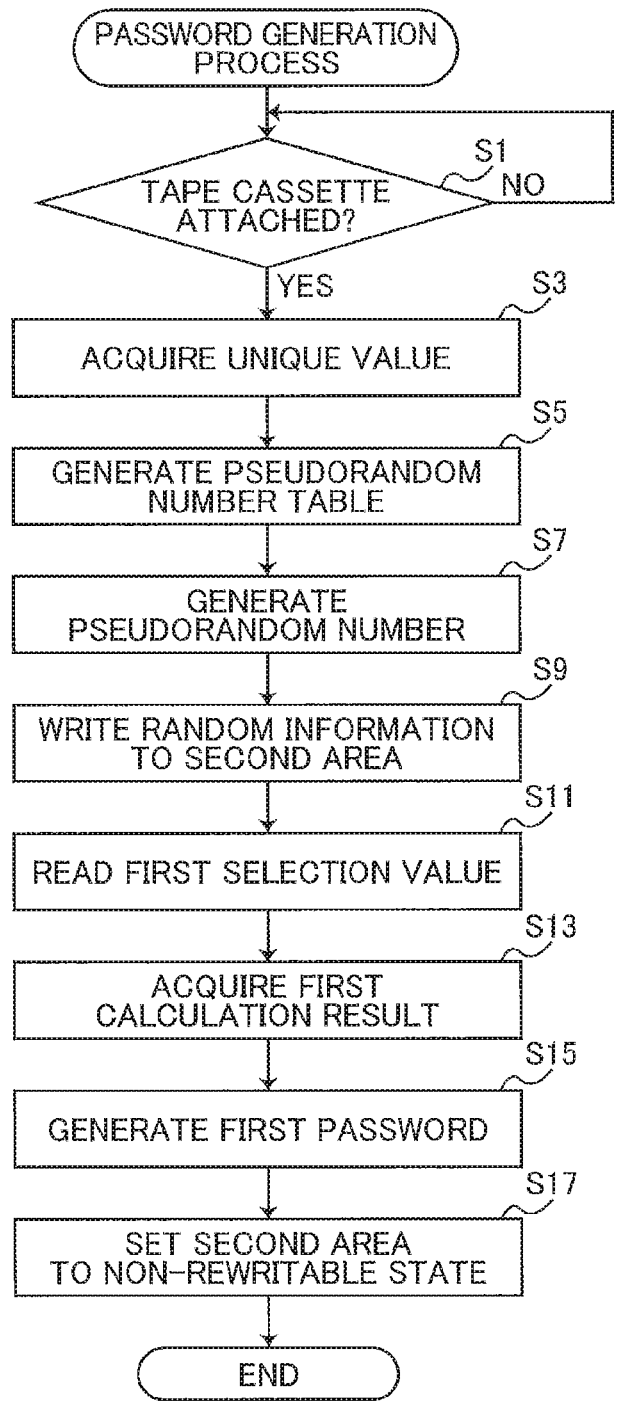
FIG. 5 is a flowchart illustrating a password generation process executed by a CPU 21 in the external device 11.

Next, electrical configurations of the printing device 1, an external device 11, and the tape cassette 30 will be described while referring to FIG. 4.

The printing device 1 further includes a control circuit 70. The control circuit 70 includes a CPU 85, a ROM 86, a CGROM 87, a RAM 88, a flash memory 89, and an input/output interface 78, all of which components are interconnected via a data bus 69. Note that the input/output interface 78 is abbreviated as "I/O interface 78" in FIG. 4. The CPU 85 performs overall control of the printing device 1. The ROM 86 stores therein various programs executed by the CPU 85. The CGROM 87 stores therein character image data to be printed on the film tape 59. The RAM 88 is provided with various storage areas such as text memory, a printing buffer and the like. The flash memory 89 stores therein data read from the RFID tag 350 and data to be written to the RFID tag 350, for example.

The keyboard 3, a liquid crystal drive circuit (LCDC) 25, drive circuits 26, 27, and 28, and the RFID reader/writer 200 are also connected to the input/output interface 78. The LCDC 25 has a video RAM (not illustrated) for outputting display data to the liquid crystal display 5. The drive circuit 26 is an electronic circuit for driving the thermal head 10. The drive circuit 27 is an electronic circuit for driving the tape feed motor 23 by which the tape 50 is conveyed downstream. The drive circuit 28 is an electronic circuit for driving a cutting motor 24 that actuates the cutting mechanism 17.

Next, the electrical configuration of the external device 1 will be described with reference to FIG. 4. The external device 11 is used when manufacturing the tape cassette 30. The external device 11 is provided with a CPU 21, a ROM 22, a RAM 29, an RFID reader/writer 311, and the like. The CPU 21 controls operations of the external device 11. The ROM 22 stores therein a password generation program for the CPU 21 to execute a password generation process (described later). The RAM 29 temporarily stores various information therein. The RFID reader/writer 311 has a configuration similar to a common RFID reader/writer, and includes an antenna 312 and a writer IC 313. The RFID reader/writer 311 is connected to the CPU 21 via an input/output interface 79 (abbreviated as "I/O interface 79" in FIG. 4).

The electrical configuration of the tape cassette 30 will be described next with reference to FIG. 4. The RFID tag 350 performs wireless communication between the antenna 353 and the antenna 201 of the RFID reader/writer 200 provided in the printing device 1. The RFID tag 350 also performs wireless communication between the antenna 353 thereof and the antenna 312 of the RFID reader/writer 311 provided in the external device 11. Through this wireless communication, the tape cassette 30 can transmit and receive various data between the RFID tag 350 and the RFID reader/writer 200 and between the RFID tag 350 and the RFID reader/writer 311.

The cassette memory 358 of the RFID tag 350 has a plurality of storage areas for storing various information. Specifically, the cassette memory 358 is provided with a first area R1 and a second area R2, as illustrated in FIGS. 6A through 6D. The first area R1 of the cassette memory 358 includes an ID identification area 81, and a tape information area 82. The ID identification area 81 is a read-only memory area, and the tape information area 82 is a memory area that becomes read-only after specific information is written thereinto. The second area R2 is provided with an address area 83, and a password area 84. The address area 83 is a writable memory area, and the password area 84 is a write-only memory area.

The ID identification area 81 of the first area R stores therein data for a unique ID as unique information specific to the tape cassette 30. The unique ID has a value for identifying the tape cassette 30 that differs for each RFID tag 350. The unique ID is data indicative of a manufacturer code, serial number, and the like for the RFID tag 350. The tape information area 82 of the first area R1 stores therein tape information as the unique information. The tape information specifies an identification number, tape type, tape width, tape color (color of the double-sided adhesive tape 58), printing color (color of the ink ribbon 60), manufacturing date, manufacturing time (hours, minutes, and seconds precise to four decimal places), and the like for the tape cassette 30. That is, the unique information specific to the tape cassette 30 includes the unique ID and the tape information. Data in the ID identification area 81 and the tape information area 82 is used for authenticating the RFID tag 350.

The address area 83 of the second area R2 stores therein any arbitrary information that has been written by a user, for example, tape information related to the tape cassette 30, and information related to the RFID tag 350. The password area 84 stores therein a first password or a second password. The first password and the second password are used for setting the second area R2 of the RFID tag 350 to a non-rewritable state.

During manufacturing of the tape cassette 30, the external device 11 writes unique information specific to the tape cassette 30 and a first password to the cassette memory 358 using the writer IC 313. Specifically, an operator mounts one of a plurality of RFID tags 350 prepared in advance on the tape cassette 30. Next, the operator inserts the tape cassette 30 into a cassette attachment portion (not illustrated) provided in the external device 11. The RFID reader/writer 311 of the external device 11 then writes unique information specific to the tape cassette 30 and a first password generated based on the unique information to the cassette memory 358 in the RFID tag 350 of the attached tape cassette 30. Once writing to the cassette memory 358 is complete, the operator removes the tape cassette 30 from the external device 11 and mounts the next tape cassette 30 in the cassette attachment portion of the external device 11.

Once again, the external device 11 writes unique information specific to the new tape cassette 30 and a first password generated based on that unique information to the cassette memory 358 in the RFID tag 350 of the new tape cassette 30. This process is repeated for sequentially manufacturing tape cassettes 30 having unique information and a distinct first password written to the cassette memory 358 of their corresponding RFID tag 350.

<Flowchart for Operations During Manufacturing>

Next, the operations for writing the first password to the password area 84 during the manufacturing process will be described with reference to FIGS. 5 and 6A through 6D. When the external device 11 is powered during the manufacturing process of the tape cassette 30, the CPU 21 of the external device 11 reads the password generation program from the ROM 22 and executes the password generation process. In S1 at the beginning of the password generation process illustrated in FIG. 5, the CPU 21 determines whether a tape cassette 30 has been attached the cassette attachment portion (not illustrated) of the external device 11. When the CPU 21 determines that a tape cassette 30 is not accommodated in the cassette attachment portion (S1: NO), the CPU 21 returns to the process in S1 and waits until a tape cassette 30 has been attached to the cassette attachment portion.

When the CPU 21 determines that a tape cassette 30 has been attached to the cassette attachment portion (S1: YES), in S3 the CPU 21 controls the RFID reader/writer 311 to acquire information on a unique value for the cassette memory 358. The unique value is a value of a specific data length extracted from the unique ID included in the unique information. Specifically, the unique value is extracted from the low-order two bytes of the unique ID in the present embodiment. That is, the unique value is a value obtained from at least a part of the unique ID stored in the ID identification area 81 of the first area R1. The unique value differs for each RFID tag 350 and, hence, for each manufactured tape cassette 30.

In S5 the CPU 21 creates a pseudorandom number table based on data for the unique value. The pseudorandom number table created in S5 is random information generated according to a reproducible technique and is temporarily stored in the RAM 29. In S7, the CPU 21 generates a pseudorandom number as the random information by extracting a value in accordance with prescribed criteria from the pseudorandom number table created in S5. In S9 the CPU 21 controls the RFID reader/writer 311 to write the pseudorandom number as the random number over the entire address area 83 in the second area R2, as illustrated in FIG. 6B.

In S11 the CPU 21 reads a first selection value Data A (see FIG. 6C) from the random information written to the address area 83 of the second area R2. The first selection value Data A is stored at an address in the second area R2 identified based on a predetermined rule. The first selection value Data A is any two bytes worth of random information. Here, the predetermined rule provides the address at which the first selection value Data A is stored, for example. The flash memory 89 in the printing device 1 stores therein the rule for identifying the address in advance. The address corresponding to the first selection value Data A is arbitrarily set by the manufacturer.

In S13 the CPU 21 acquires a first calculation result by taking the logical exclusive OR (the bitwise XOR operation) on corresponding bits of the two-byte unique value in the unique ID and the first selection value Data A, which is also two bytes worth of information. In S15 the CPU 21 generates the first password by substituting the first calculation result acquired in S13 into a hash function. In other words, the first password is generated using the unique value and the first selection value Data A. In S17 the CPU 21 sets the address area 83 in the second area R2 to a non-rewritable state by storing the first password generated in S15 in the password area 84 (see FIG. 6D). Subsequently, the CPU 21 ends the password generation process.

<Flowchart for Operations During Tape Cassette 30 is Used>

Next, operations of the printing device 1 performed when a tape cassette 30 manufactured as described above is shipped and subsequently mounted on the printing device 1 for use will be described with reference to FIGS. 7 through 9D. When the printing device 1 is powered, the CPU 85 of the printing device 1 reads a program stored in the ROM 86 and executes a main process according to the program.

Figure 7:
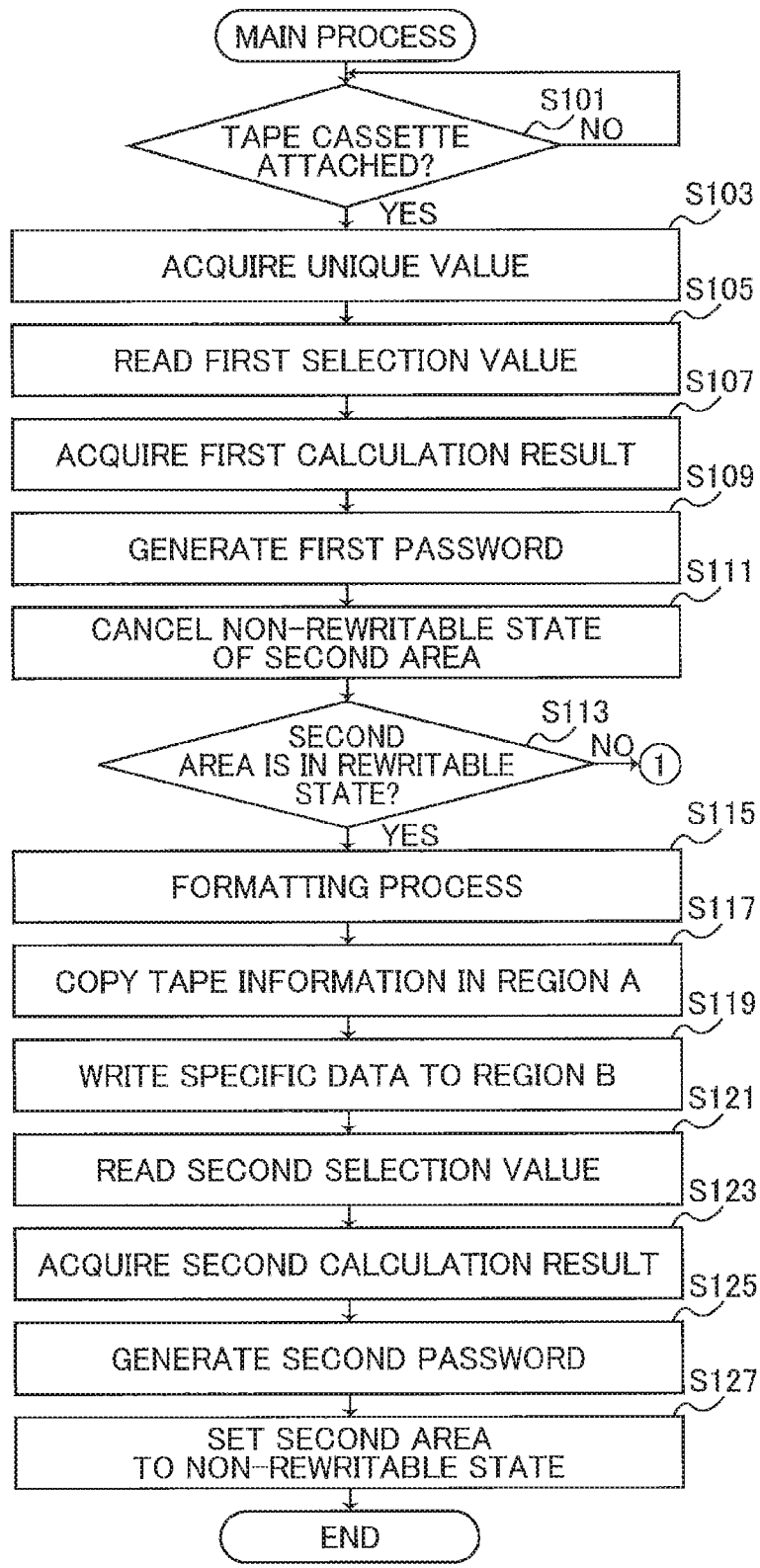
FIG. 7 is a flowchart illustrating a first part of a main process executed by a CPU 85 in the printing device 1 according to the embodiment.
Figure 8:
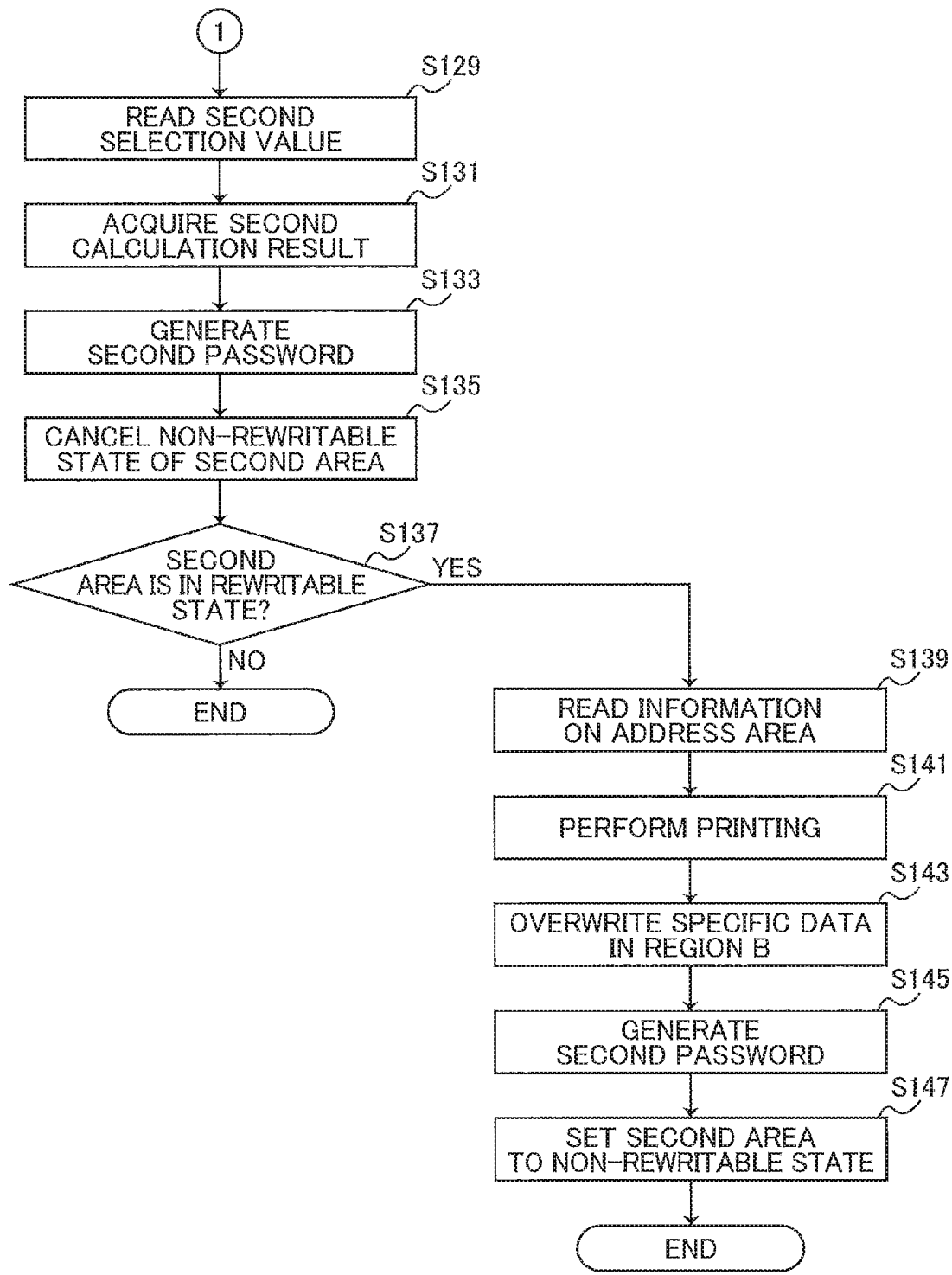
FIG. 8 is a flowchart illustrating a second part of the main process executed by the CPU 85 in the printing device 1 according to the embodiment.

In S101 of FIG. 7 at the beginning of the main process, the CPU 85 determines whether a tape cassette 30 has been attached to the cassette attachment portion 8. While determining that a tape cassette 30 has not been attached to the cassette attachment portion 8 (S101: NO), the CPU 85 waits by continually looping back to the process S101 until a tape cassette 30 has been attached to the cassette attachment portion 8.

When the CPU 85 determines that the user has attached a tape cassette 30 to the cassette attachment portion 8 (S101: YES), in S103 the CPU 85 controls the RFID reader/writer 200 to acquire the unique value from the unique ID stored in the ID identification area 81 of the first area R1. In S105 the CPU 85 controls the RFID reader/writer 200 to read the first selection value Data A at the specific address in the address area 83 of the second area R2 provided in the cassette memory 358. Note that the random information written during the manufacturing process is stored over the entire address area 83 in the second area R2 (see FIG. 9A). Hence, the first selection value Data A is random information as described above. The rule for acquiring the first selection value Data A has been stored in the flash memory 89 in advance.

In S107 the CPU 85 acquires the first calculation result by taking the logical exclusive OR of the first selection value Data A read in S105 from the specific address, and the unique value (the low-order two bytes of the unique ID) acquired in S103. In S109 the CPU 85 generates the first password by substituting the first calculation result acquired in S107 into the hash function.

In S111 the CPU 85 attempts to cancel the non-rewritable state of the address area 83 in the second area R2 using the first password generated in S109. In S113 the CPU 85 determines whether the address area 83 in the second area R2 has been switched from the non-rewritable state to a rewritable state. The CPU 85 determines that the address area 83 is in the rewritable state when an ACK signal has been received from the RFID tag 350 after the process in S111 and determines that the address area 83 remains in the non-rewritable state when a NACK signal has been received from the RFID tag 350, for example. When the tape cassette 30 is a new product, the CPU 85 can switch the address area 83 of the second area R2 to a rewritable state since the first password is stored in the password area 84 of the second area R2.

When the CPU 85 determines that the tape cassette 30 is a new product, i.e., that the address area 83 has been switched to a rewritable state using the first password (S113: YES), in S115 the CPU 85 performs a formatting process on the address area 83 of the second area R2 so that the address area 83 of the second area R2 can be used. In the formatting process, the CPU 85 writes a specific value (0xFF, for example) over the entire address area 83 in the second area R2 (see FIG. 9B), where the non-rewritable state has been cancelled in S111. Through this formatting process, the CPU 85 overwrites the entire region of the address area 83 with the specific value. Thus, the random information written in the address area 83 of the second area R2 during the manufacturing process based on the pseudorandom number table is overwritten by the specific value.

In S117 the CPU 85 copies the tape information stored in the tape information area 82 of the first area R1 (see FIG. 9C) to a region A in the address area 83 of the second area R2 (see FIG. 9C). Specifically, the CPU 85 writes the tape information stored in the tape information area 82 of the first area R1 to the region A in the address area 83 of the second area R2 in which the specific value (the information F in this example) has been written (see FIG. 9C). In S119 the CPU 85 writes specific data to a region B in the address area 83 of the second area R2 (see FIG. 9C). The specific data is information related to the remaining length of the tape 50 (i.e., the film tape 59) that can be printed, for example.

In S121 the CPU 85 reads a second selection value Data X from the specific data stored in the region B of the address area 83. The second selection value Data X is two bytes worth of data stored at an address specified by another rule. The address of the second selection value Data X differs from the address specified during the manufacturing process. The rule provides the address at which the second selection value Data X is written. The rule is stored in the flash memory 89 in advance.

In S123 the CPU 85 acquires a second calculation result by taking the logical exclusive OR between the unique value in the unique ID stored in the first area R1 and the second selection value Data X. In S125 the CPU 85 generates a second password by substituting the second calculation result calculated in S123 into a hash function. In S127 the CPU 85 sets the address area 83 of the second area R2 in which the tape information (unique information) has been written to a non-rewritable state by writing the second password generated in S125 to the password area 84 (see FIG. 9D). Subsequently, the CPU 85 ends the main process.

On the other hand, if the tape cassette 30 attached to the cassette attachment portion 8 is not a new product, i.e., when the address area 83 in the second area R2 cannot be set to a rewritable state using the first password (S113: NO), the CPU 85 infers that the tape cassette 30 has past usage history, and in S129 of FIG. 8 reads the second selection value Data X from the region B in the address area 83 of the second area R2. In S131 the CPU 85 calculates the second calculation result by taking the logical exclusive OR of the unique value in the unique ID stored in the ID identification area 81 of the first area R1 and the second selection value Data X read in S129. In S133 the CPU 85 generates the second password by substituting the second calculation result found in S131 into a hash function.

In S135 the CPU 85 attempts to cancel the non-rewritable state of the address area 83 in the second area R2 of the RFID tag 350 using the second password generated in S133. In S137 the CPU 85 determines whether the non-rewritable state of the address area 83 in the second area R2 has been cancelled using the second password. Similar to a case where the non-rewritable state of the address area 83 is cancelled using the first password, the CPU 85 determines whether the non-rewritable state has been cancelled based on the ACK or NACK signal received.

When the non-rewritable state of the address area 83 could not be cancelled with the second password (S137: NO), the CPU 85 determines that the tape cassette 30 is not in a printable state and ends the main process. This may occur when the password for the tape cassette 30 was leaked and the content of the tape cassette 30 may have been altered. In such a case, the CPU 85 cannot perform printing using the tape cassette 30.

On the other hand, when the CPU 85 determines that the non-rewritable state of the address area 83 in the second area R2 has been cancelled (8137: YES), in S139 the CPU 85 reads tape information and the like from the address area 83 of the second area R2, which is now rewritable owing to the second password. The CPU 85 stores the tape information and the like read in S139 in the flash memory 89. In S141 the CPU 85 performs printing on the film tape 59 based on the tape information and the like written into the flash memory 89.

In S143 the CPU 85 overwrites the specific data in the region B of the second area R2. In S145 the CPU 85 generates the second password by executing the same process in S121 to S125 described above. Since the specific data written in the region B of the address area 83 is updated through the process of S143, the second password is now a different value from the second password generated in S123. In S147 the CPU 85 sets the address area 83 of the second area R2 to a non-rewritable state by storing the second password generated in S143 in the password area 84. Subsequently, the CPU 85 ends the main process.

Advantageous Effects

As described above, a first password for the tape cassette 30 according to the above-described embodiment is generated using the unique value and the first selection value Data A. The address area 83 in the second area R2 is locked by the first password and is non-rewritable in this state. The first password is not easily leaked since the password is generated from unique information for the tape cassette 30. Hence, the tape cassette 30 can enhance the security of information stored in the RFID tag 350.

The unique information includes a unique ID that identifies the tape cassette 30, and the first selection value Data A is random information generated based on the unique ID. That is, the first password for the tape cassette 30 is generated based on random information. Accordingly, the tape cassette 30 can enhance the security of information stored in the RFID tag 350.

The unique value is the value included in the low-order two bytes of the unique ID included in the unique information. The first password is generated by substituting the first calculation result calculated by taking the logical exclusive OR of the unique value and the first selection value Data A into a hash function. In other words, a first password is generated for each tape cassette 30 based on information for the unique ID and the first selection value Data A, which is a random value generated from the unique ID. Accordingly, the tape cassette 30 can further enhance security.

When using a new tape cassette 30 in the printing device 1 described above, in S125 the CPU 85 generates a second password different from the first password. In S127 the CPU 85 uses the second password to set the address area 83 of the second area R2 in which the tape information (unique information) is written to a non-rewritable state. Therefore, the printing device 1 can enhance the security of information stored in the RFID tag 350 provided on the tape cassette 30.

In S115 the CPU 85 writes specific information over the entire second area R2 after the non-rewritable state of the address area 83 has been cancelled. In this way, the printing device 1 can switch the second area R2 of the RFID tag 350 to a state that is usable as memory. Therefore, if information stored in the address area 83 of the second area R2 has been altered, the printing device 1 can invalidate the altered information in the address area 83.

In S113 the CPU 85 determines whether the non-rewritable state of the address area 83 in the second area R2 has been removed by the first password generated in S109. When the CPU 85 determines that the non-rewritable state of the address area 83 has not been cancelled (S113: NO), in S135 the CPU 85 attempts to remove the non-rewritable state of the address area 83 in the second area R2 provided in the RFID tag 350 using a second password generated in S133.

When the non-rewritable state of the address area 83 in the second area R2 has been cancelled using the second password (S137: YES), in S141 the CPU 85 performs printing on the film tape 59 based on the tape information written in the address area 83 of the second area R2. Hence, when the non-rewritable state of the address area 83 in the second area R2 has been cancelled, the printing device 1 can perform printing based on tape information written in the region A provided in the address area 83 of the second area R2.

The CPU 85 does not perform printing when determining that the non-rewritable state of the address area 83 in the second area R2 cannot be removed using the second password (S137: NO). Therefore, the printing device 1 can determine that the information stored on the tape cassette 30 is inappropriate, for example, thereby avoiding any printing based on inappropriate information.

The unique value is a value extracted from the low-order two bytes of the unique ID included in the unique information. The CPU 85 calculates the second calculation result by taking the logical exclusive OR of the unique value in the unique ID stored in the ID identification area 81 of the first area R1, and the second selection value Data X, which is information stored at an address identified by a different rule from the rule used to identify the address of the first selection value Data A. The CPU 85 generates a second password by substituting the second calculation result into a hash function. Therefore, the printing device 1 can enhance the security of information stored on the RFID tag 350 provided on the tape cassette 30.

Modifications of the Embodiment

While the description has been made in detail with reference to the embodiment, it would be apparent to those skilled in the art that many modifications and variations may be made thereto. For example, the RFID tag 350 in the embodiment described above may be a storage element other than an RFID tag, provided that the storage element uses a wireless communication method. The RFID reader/writer 200 may be a reader/writer using a wireless communication method other than an RFID tag.

During the manufacturing process, the operator uses the external device 11 to write unique information and a first password to the cassette memory 358. However, a printing device 1 may be provided for use in the manufacturing process, for example. Here, the operator may use a writer IC 203 in the printing device 1 provided for the manufacturing process to write the unique information and first password to the cassette memory 358.

The unique value is a value in the low-order two bytes of the unique ID in the above-described embodiment, but the unique value may be a value in the tape information instead. Further, the length of the data serving as the unique value is not limited to two bytes but may be three bytes or the like. The random information is generated based on the unique ID in the above-described embodiment, but the random information may instead be generated based on the tape information. In this case, the first selection value Data A is random information generated based on the tape information.

Further, the first password is generated based on random information in the above-described embodiment, but the random information may be other information capable of identifying the tape cassette 30. The first password and the second password are calculated using a hash function in the above-described embodiment, but these passwords may be generated through a different encryption process.

In the process of S9, random information based on the unique ID is written to the address area 83 of the second area R2, but the random information written to the address area 83 may be based on information other than the unique ID. For example, random information based on the tape information rather than the unique information may be written to the address area 83. Further, while the information "F" is written to the address area 83 in the process of S115, other information may be written to the address area 83 instead. In the process of S143, the specific data written to the address area 83 is not limited to the remaining length of the film tape 59. For example, the specific data may be arbitrary fixed information, such as a value in the region A of the address area 83. In this case, the second password generated in the process of S145 will have the same value as the password generated in S133.

REMARKS

The tape cassette 30 is an example of a tape cassette. The cassette case 31 is an example of a case. The film tape 59 is an example of a tape. The cassette memory 358 is an example of a cassette memory. The first area R1 is an example of a first area. The unique information specific to the tape cassette 30 is an example of unique information. The second area R2 is an example of a second area. The random information is an example of arbitrary information. The unique value is an example of a unique value. The first selection value Data A is an example of a first selection value. The rule for specifying the first selection value Data A is an example of a predetermined rule. The unique ID included in the unique information is an example of a unique ID. The tape information included in the unique information is an example of tape information. The unique value and the tape information are also an example of the unique information. A value extracted from the low-order two bytes of the unique ID (the unique value) is an example of a value of a specific data length. The first calculation result is an example of a first calculation result. The printing device 1 is an example of a printing device. The cassette attachment portion 8 is an example of an attachment portion. The flash memory 89 is an example of a device memory. The CPU 85 is an example of a controller. The information F is an example of a specific value. The region A of the second area R2 is an example of a part of the second area. The second calculation result is an example of a second calculation result. The second selection value Data X is an example of a second selection value. The process in S103 executed by the CPU 85 is an example of (a) acquiring. The process in S109 executed by the CPU 85 is an example of (b) generating. The process in S111 executed by the CPU 85 is an example of (c) attempting. The process in S115 executed by the CPU 85 is an example of (d) writing. The process in S117 executed by the CPU 85 is an example of (e) writing. The process in S125 executed by the CPU 85 is an example of (f) generating. The process in S127 executed by the CPU 85 is an example of (g) setting. The process in S113 executed by the CPU 85 is an example of (h) determining. The process in S133 executed by the CPU 85 is an example of (i) generating. The process in S135 executed by the CPU 85 is an example of (j) attempting. The process in S141 executed by the CPU 85 is an example of (k) printing.

What is claimed is:

1. A tape cassette comprising:
   a case accommodating therein a tape as a printing medium; and
   a cassette memory comprising:
      a first area storing therein unique information specific to the tape cassette; and
      a second area storing therein arbitrary information in an entire area thereof,
   wherein the second area is set to a non-rewritable state using a first password such that the arbitrary information written therein is not rewritable, the first password being generated using a unique value which is a value of at least a part of the unique information stored in the first area and a first selection value which is an arbitrary value stored in a part of the second area specified by a predetermined rule.

2. The tape cassette according to claim 1, wherein the unique information includes a unique ID for identifying the tape cassette and tape information which is information related to the tape, and
   wherein the arbitrary information is random information generated based on one of the unique ID and the tape information.

3. The tape cassette according to claim 2, wherein the unique value is a value of a specific data length extracted from the unique ID included in the unique information, and
   wherein the first password is generated by substituting, into a hash function, a first calculation result calculated by taking an exclusive OR between the unique value and the first selection value.

4. A printing device comprising:
   an attachment portion to which the tape cassette according to claim 1 is attachable;
   a device memory storing therein the predetermined rule in advance; and
   a controller configured to perform:
      (a) acquiring the unique information from the first area of the cassette memory of the tape cassette attached to the attachment portion;
      (b) generating a first password using the unique value included in the unique information acquired in the (a) acquiring and the first selection value specified by the predetermined rule stored in the device memory;
      (c) attempting to cancel the non-rewritable state of the second area using the first password generated in the (b) generating;
      (d) writing a specific value into the entire area of the second area in which the non-rewritable state has been cancelled in the (c) attempting;
      (e) writing a copy of the unique information stored in the first area of the cassette memory into a part of the second area into which the specific value has been written in the (d) writing;
      (f) generating a second password different from the first password; and
      (g) setting, using the second password generated in the (f) generating, the second area into which the unique information has been written in the (e) writing to the non-rewritable state.

5. The printing device according to claim 4, wherein the controller is configured to further perform:
   (h) determining whether the non-rewritable state of the second area has been cancelled in the (c) attempting using the first password generated in the (b) generating;
   when determining in the (h) determining that the non-rewritable state of the second area has not been cancelled, (i) generating a second password different from the first password;
   (j) attempting to cancel the non-rewritable state of the second area using the second password generated in the (i) generating; and
   when the non-rewritable state of the second area has been cancelled in the (j) attempting using the second password, (k) printing on the tape based on the copy of the unique information written into the second area in the (e) writing.

6. The printing device according to claim 5, wherein, when the non-rewritable state of the second area has not been cancelled in the (j) attempting using the second password, the controller is configured not to perform the (k) printing.

7. The printing device according to claim 4, wherein the unique information includes a unique ID for identifying the tape cassette,
   wherein the unique value is a value of a specific data length extracted from the unique ID, and
   wherein the (f) generating generates the second password by substituting, into a hash function, a second calculation result calculated by taking an exclusive OR between the unique value of the unique ID stored in the first area and a second selection value stored in a part of the second area specified by another rule different from the predetermined rule.

* * * * *